W. H. BARNS.
COFFEE MILL.
No. 81,869.          Patented Sept. 8, 1868.
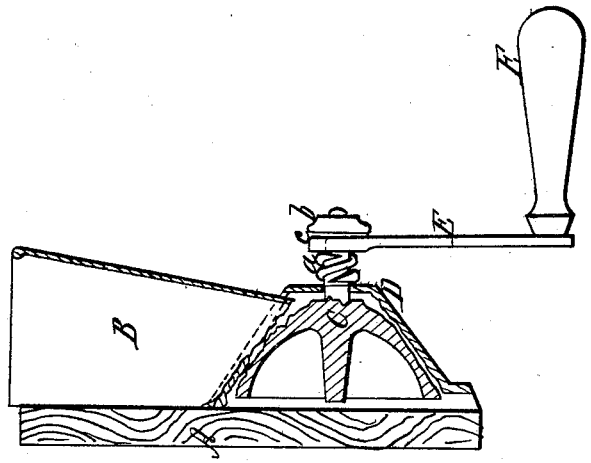
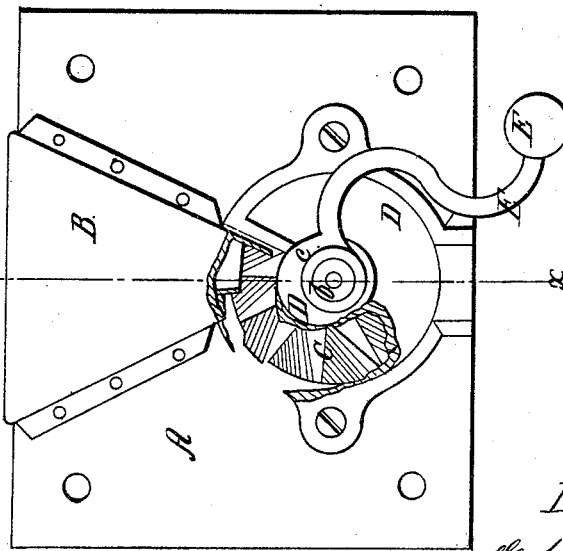

United States Patent Office.

WILLIAM H. BARNS, OF NEW LONDON, CONNECTICUT.

Letters Patent No. 81,869, dated September 8, 1868.

IMPROVED COFFEE-MILL.

The Schedule referred to in these Letters Patent and making part of the same.

TO ALL WHOM IT MAY CONCERN:

Be it known that I, WILLIAM H. BARNS, of New London, in the county of New London, and State of Connecticut, have invented a new and improved Mill for Grinding Coffee and other substances; and I do hereby declare that the following is a full, clear, and exact description thereof, which will enable those skilled in the art to make and use the same, reference being had to the accompanying drawings, forming part of this specification, in which—

Figure 1 is a front view of my improved mill, showing a portion of the shell broken away, to exhibit the runner within.

Figure 2 is a section of the mill through the line $x\ x$, fig. 1.

Similar letters of reference indicate corresponding parts.

This invention consists in placing a coiled spring around the arbor of the rotating grinding-plate or runner, so called, of a coffee-mill, or such other analogous grinding-mills as are susceptible of and are improved by the application of the coiled spring, as above mentioned.

In the drawings, A is the board to which such mills are usually affixed.

B is the hopper.

D, the shell.

C, the runner, and

E E the crank-handle, set on the arbor of the runner, to rotate the latter in the operation of grinding.

The coiled spring $a$ is on the arbor of the runner, and exerts its tension against the plane face of the shell and the eye $e$ of the crank, as shown, which latter is held on by a nut, $b$, working on a screw-thread on the end of the arbor of the runner C.

The eye $e$ of the crank is fitted in a squared (or other suitably-formed) end of the arbor, so as to move in or out on the said arbor, in obedience to the nut $b$ or spring $a$, respectively, so that when the nut is turned to actuate the eye against the spring, the latter will be compressed, and greater tension thereby obtained.

When the nut is turned in the reverse direction, the spring will be proportionately relieved, and consequently less tension upon the spring will result.

By these operations it will be seen that the runner may be made to impinge upon the grinding-surface of the shell with more or less force, and will thereby grind finer or coarser, according as it is adjusted for that object, by turning the nut $b$.

The advantages of this invention are as follows:

First, the adjusting-burr, which in such mills was heretofore placed on the back, is dispensed with, thus permitting the board A to be affixed to a flat wall or other suitable surface, for when the adjusting-burr is placed on the back of the mill, the latter must be affixed to some beam or like place, so that the board A can project from the wall, for the purpose of having the said burr on the back accessible to adjust the mill.

Second, any hard foreign substance, getting by accident into the mill, will not break or stop it, for the spring will yield and allow it to pass through without damage.

Third, the runner can be adjusted with greater exactness, and the spring-tension will keep such adjustment from becoming impaired.

I claim as new, and desire to secure by Letters Patent—

The combination and arrangement of the coiled spring $a$ with the arbor of the runner C, shell D, and nut $b$, all operating substantially as shown and described, and for the purpose set forth.

The above specification of my invention signed by me, this nineteenth day of June, 1868.

WM. H. BARNS.

Witnesses:
JOHN GRACE,
EDWARD T. BROWN